US012761828B2

(12) United States Patent
Singh

(10) Patent No.: US 12,761,828 B2
(45) Date of Patent: Oct. 13, 2026

(54) DISTRIBUTED NETWORK PROVIDING CERTIFICATE RIGHTS FOR INTELLIGENT MODELING OUTPUTS

(71) Applicant: BANK OF AMERICA CORPORATION, Charlotte, NC (US)

(72) Inventor: Shailendra Singh, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 382 days.

(21) Appl. No.: 17/825,141

(22) Filed: May 26, 2022

(65) Prior Publication Data

US 2023/0384967 A1 Nov. 30, 2023

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
CPC ....... G06F 3/0655; G06F 3/0604; G06F 3/067
USPC .......................................................... 707/673
See application file for complete search history.

(56) References Cited

U.S. PATENT DOCUMENTS 8,515,777 B1 8/2013 Rajasenan
9,311,670 B2 4/2016 Hoffberg
9,720,849 B2 8/2017 Amarendran et al.
9,794,797 B2 10/2017 Hoffberg
11,032,072 B2 6/2021 Andon et al.
11,070,452 B1 7/2021 Roy et al.
11,257,073 B2 2/2022 Padmanabhan
11,334,875 B2 5/2022 Yantis et al.
2018/0054490 A1 2/2018 Wadhwa et al.
2018/0247191 A1 8/2018 Katz et al.
2019/0385071 A1 12/2019 Von Bencke et al.
2020/0042989 A1 2/2020 Ramadoss et al.
2020/0294128 A1 9/2020 Cella
2020/0387965 A1 12/2020 Cella
2021/0082044 A1 3/2021 Sliwka et al.
2021/0152354 A1 5/2021 Wentz
2021/0256070 A1 8/2021 Tran et al.
2022/0040557 A1 2/2022 Tran
2022/0123948 A1 4/2022 Wentz et al.
2022/0124013 A1 4/2022 Chitalia et al.
2022/0139546 A1* 5/2022 Manjunath ............ H04L 9/3231 705/2
2022/0188839 A1 6/2022 Andon et al.
2022/0207119 A1 6/2022 Andon et al.
2022/0342958 A1* 10/2022 Lillard .................... G06F 16/51
2023/0259640 A1* 8/2023 Metzler ............... G06F 21/6218 713/191
2023/0384967 A1* 11/2023 Singh ..................... G06N 20/00

* cited by examiner

*Primary Examiner* — Tony Mahmoudi
(74) *Attorney, Agent, or Firm* — Moore & Van Allen PLLC; Nicholas C. Russell

(57) ABSTRACT

The present invention is generally related to systems and methods for providing an improved authentication and verification system for artificial intelligence (AI) and machine learning (ML) model output. The invention immutably stores AI and ML decisioning data, resource data, and metadata in a non-fungible token format such that this data can be traced, relocated, and validated at a later time. Decisioning data of AI and ML model output is incorruptible and more reliable as a result.

20 Claims, 7 Drawing Sheets

DISTRIBUTED NETWORK PROVIDING CERTIFICATE RIGHTS FOR INTELLIGENT MODELING OUTPUTS

FIELD OF THE INVENTION

The present invention is generally related to systems and methods for providing an improved authentication and verification system for machine learning and artificial intelligence data.

BACKGROUND

As the use of artificial intelligence (AI) and machine learning (ML) becomes more prevalent, large entities may utilize this technology to enhance, automate, and support various activities involving decisioning, user validation, resource protection, scenario forecasting, or the like. Currently, there is no mechanism which can be used to validate proof of ownership of decision performed by AI-ML applications. To make AI-ML accountable and immutably traceable, there is need to develop method that can capture proof of ownership of decisions made by AI-ML programs which includes conditions based on which AI-ML program made such decisions.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The systems and methods described herein address the above needs by providing an intelligent non-fungible token (NFT) based apparatus to capture proof of ownership of decisions made by AI-ML applications. The systems and methods treat decisions performed by AI-ML applications as a unique cognitive data which is derived based on some features extracted from given resources. Proposed methods extract and aggregate all data and metadata that is used and generated during AI-ML operations. This data is then annotated and linked to one or many non-fungible tokens (NFTs). For every AI-ML application decision, the invention generates an NFT in real-time, or near-real-time, and stores this information in a distributed register, distributed ledger, or the like, for future validation.

Embodiments of the invention relate to systems, methods, and computer program products for enhanced brand element protection and automated response, the invention including: initiate an application portal on a user device; transmit instructions to the application to collect data and metadata related to an artificial intelligence or machine learning action or decision; categorize and containerize the data and metadata related to an artificial intelligence or machine learning action or decision; generate an index file for the categorized and containerized data and metadata; generate a non-fungible token (NFT) for storing the categorized and containerized data and metadata; and store the index file and store address information for the generated NFT in a decision repository.

In some embodiments, the application portal further comprises a smart contract engine.

In some embodiments, collecting data and metadata related to the artificial intelligence or machine learning action or decision further comprises using a deep learning engine to extract data from one or more servers.

In some embodiments, data and metadata related to an artificial intelligence or machine learning action or decision further comprise infrastructure resource data including one or more of an IP address, device information, server information, host environment details, or geolocation data.

In some embodiments, data and metadata related to an artificial intelligence or machine learning action or decision further comprise algorithm features including one or more of a model version, data semantics, algorithm type, data capture files, data formats, or data logs.

In some embodiments, the invention further comprises generating multiple NFTs for different categories of information.

In some embodiments, the multiple NFTs are containerized in a container group, wherein the container group is assigned its own unique identifier for indexing.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
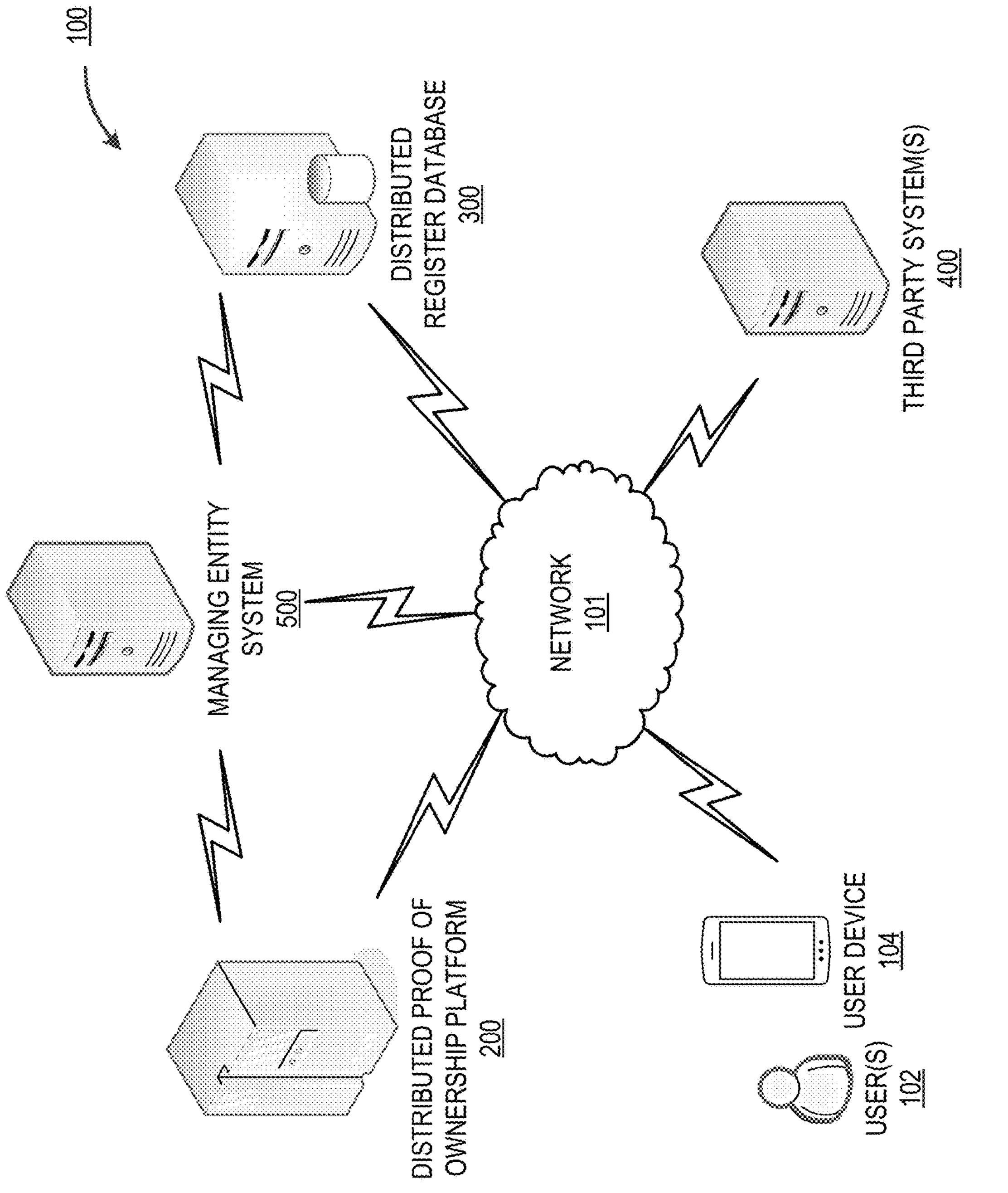
Figure 2:
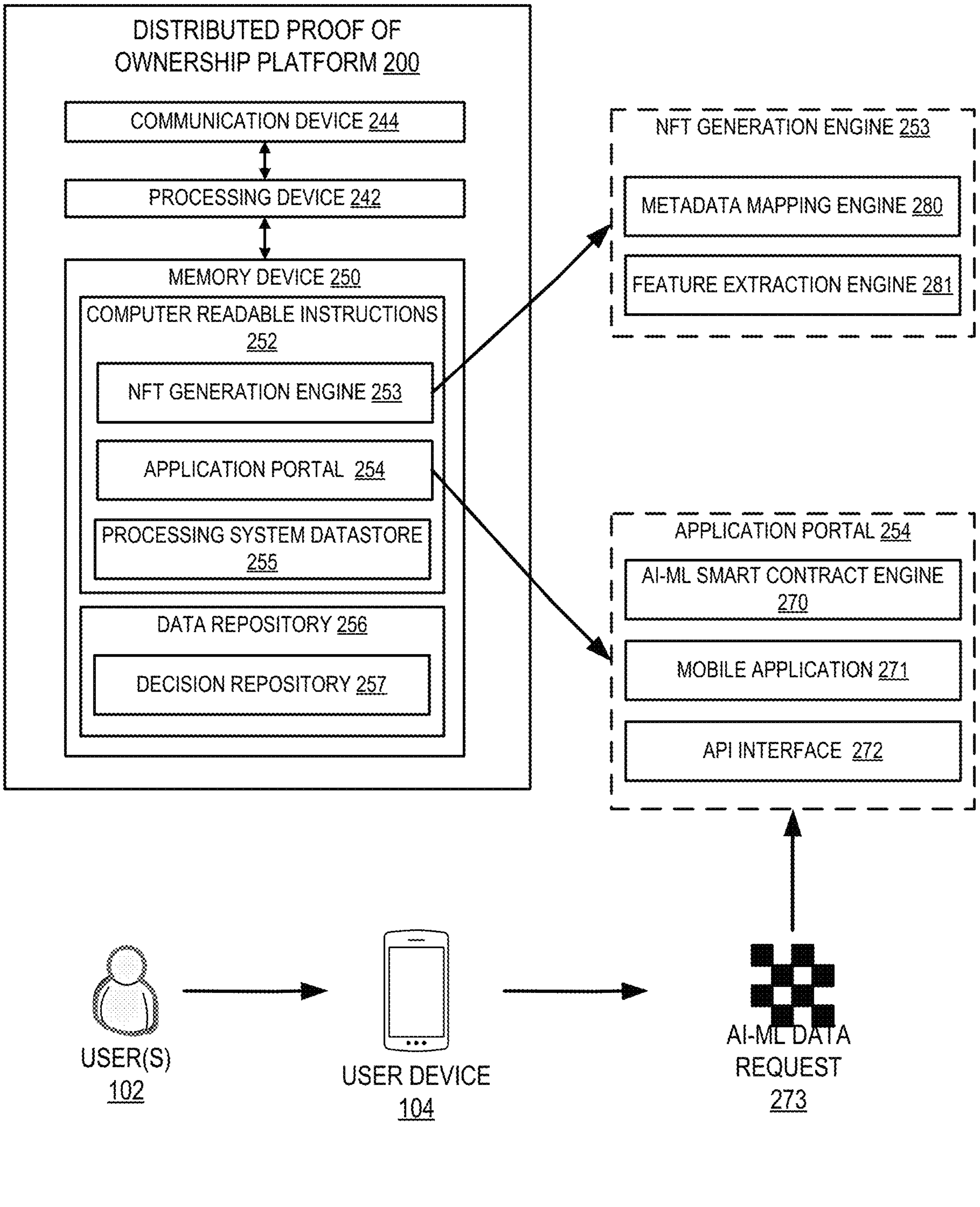
Figure 3:
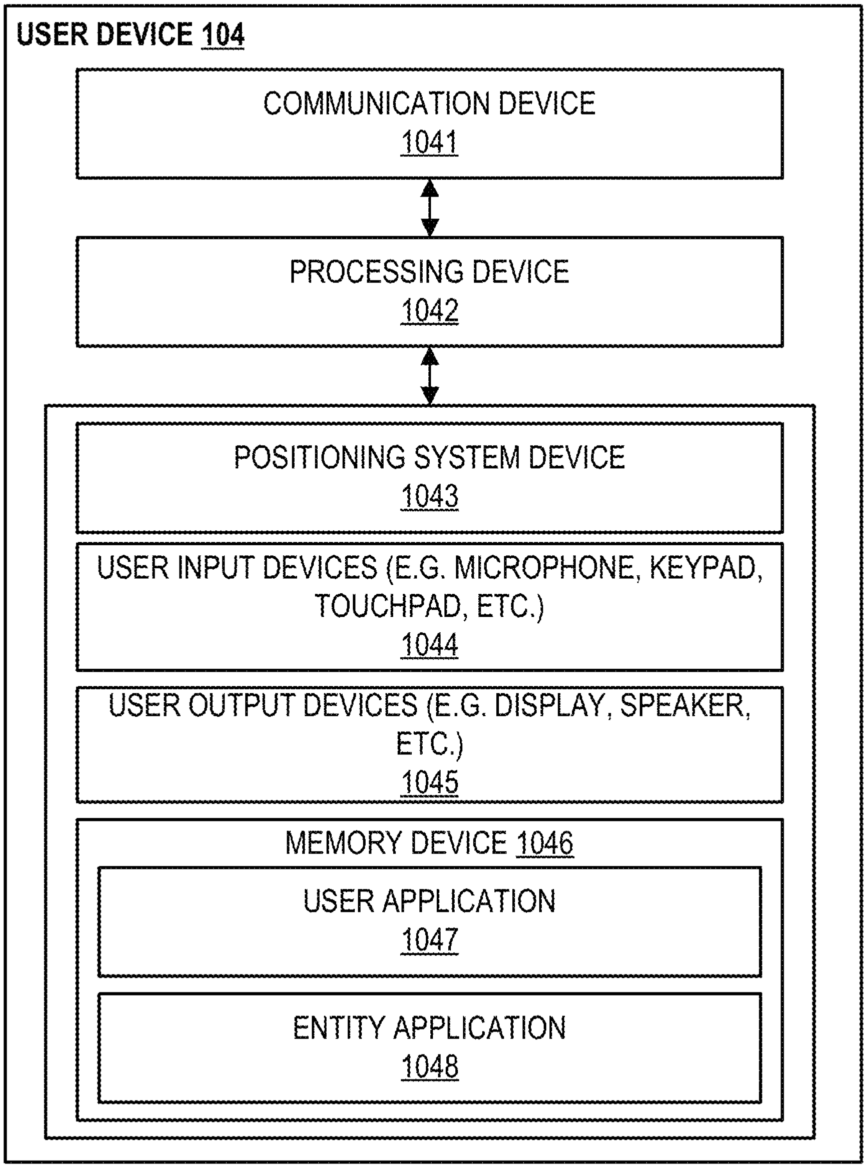
Figure 4:
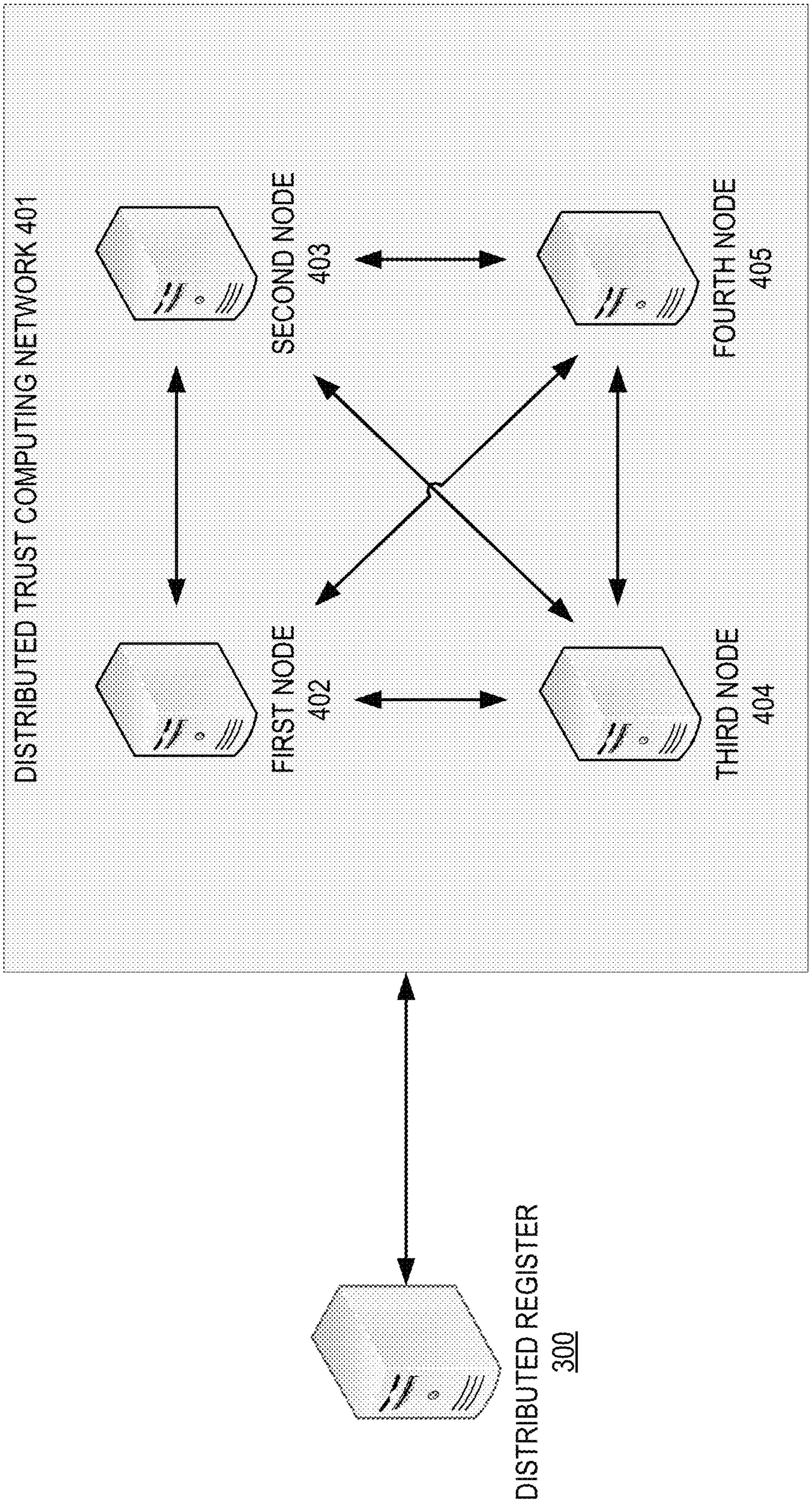
Figure 5:
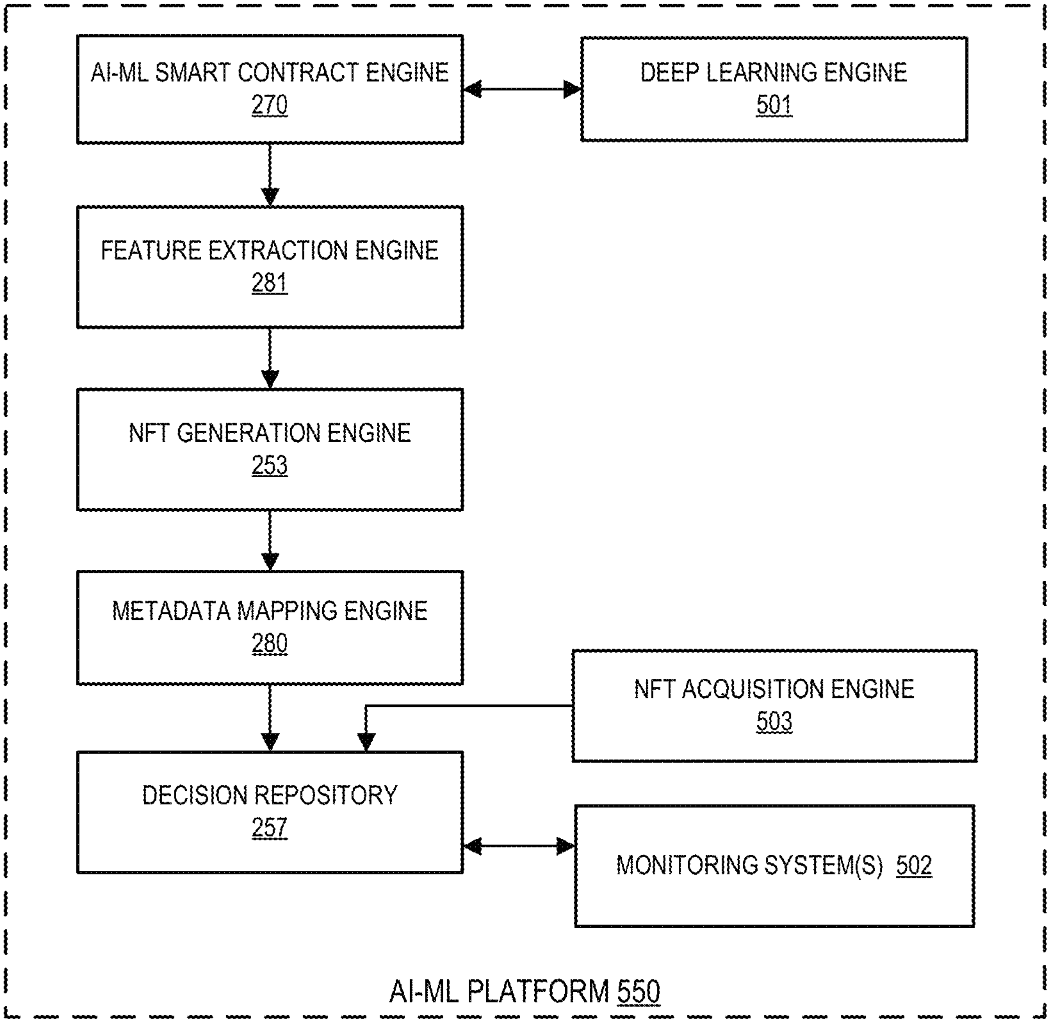
Figure 6:
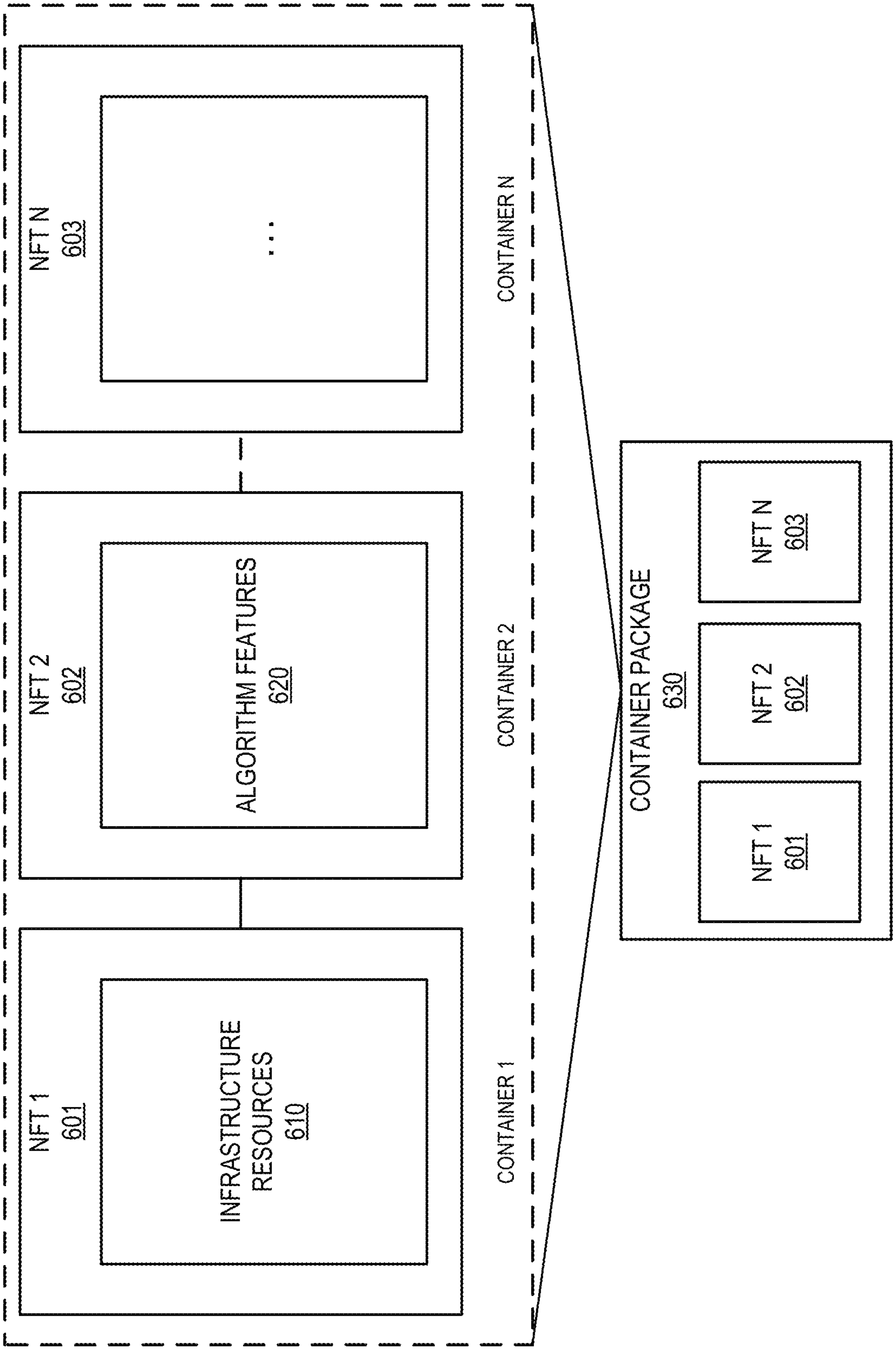
Figure 7:
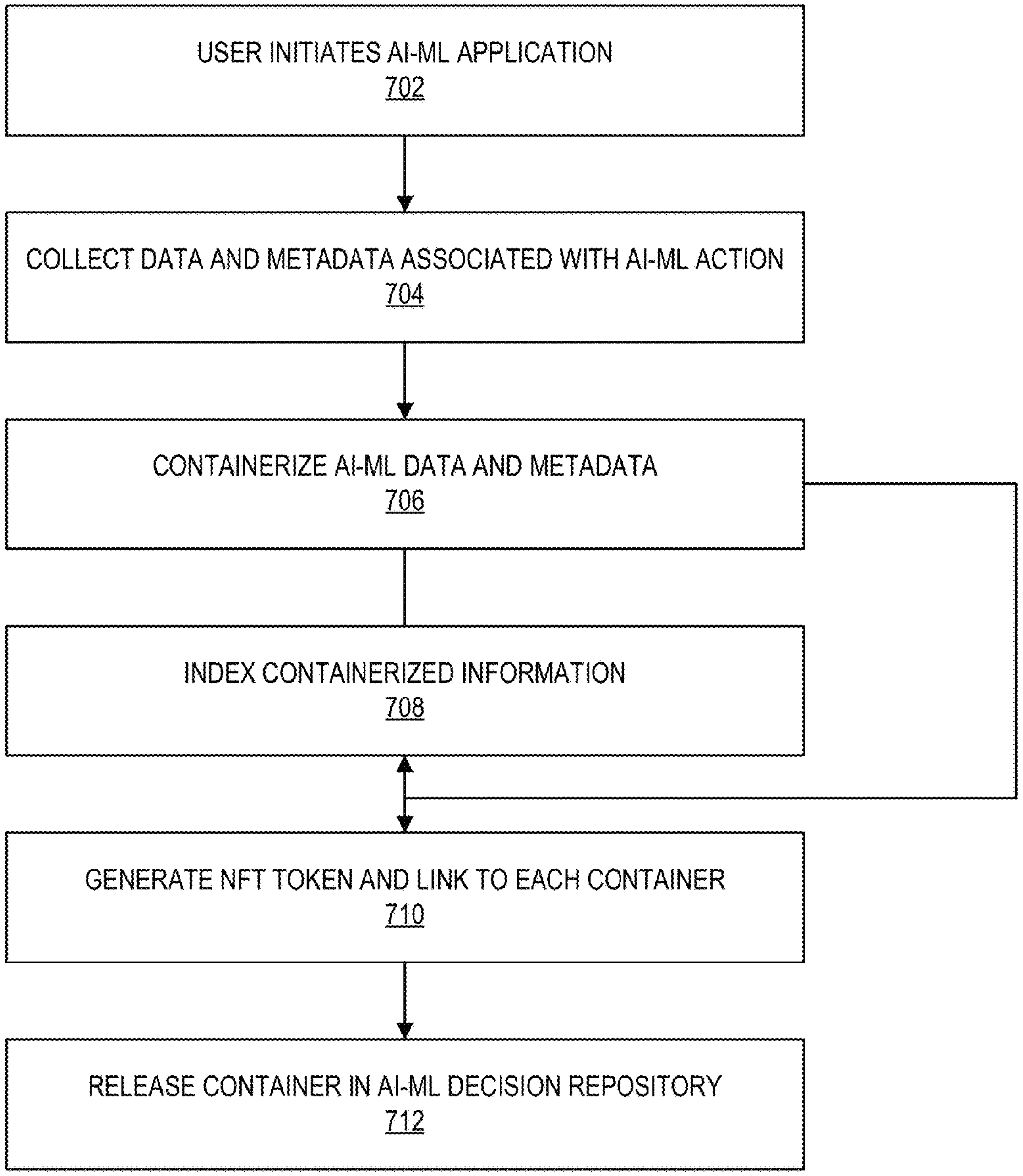

Having thus described embodiments of the invention in general terms, reference will now be made to the accompanying drawings, wherein:

FIG. 1 illustrates an operating environment for a distributed proof of ownership platform, in accordance with some embodiments of the invention;

FIG. 2 is a block diagram illustrating the distributed proof of ownership platform, in accordance with some embodiments of the invention;

FIG. 3 is a block diagram illustrating a user device associated with the distributed proof of ownership platform, in accordance with some embodiments of the invention;

FIG. 4 is a block diagram illustrating an operating environment for the distributed trust computing network, in accordance with some embodiments of the invention;

FIG. 5 is a block diagram illustrating the data flow for NFT tagging of AI-ML decisioning, in accordance with some embodiments of the invention;

FIG. 6 is a block diagram illustrating NFT containerization, in accordance with some embodiments of the invention; and FIG. 7 is a process flow illustrating user initiation of NFT containerization, in accordance with some embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some instances, a "user" is an individual who has a relationship with the entity, such as a customer or a prospective customer. Accordingly, as used herein the term "user device" or "mobile device" may refer to mobile phones, personal computing devices, tablet computers, wearable devices, and/or any portable electronic device capable of receiving and/or storing data therein and are owned, operated, or managed by a user.

"Transaction" or "resource transfer" as used herein may refer to any communication between a user and a third party merchant or individual to transfer funds for purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

"Agent" as used herein may refer to a computer program or device with the ability to actively collect, gather, scrape, extract, or otherwise infer information related to AI-ML decisioning and resource usage. "Portal" as used herein may refer to a computer program, web-accessible page, mobile application, or the like used to interact with the entity systems, process potential brand element data, and retrieve, compare, or analyze information extracted from a distributed register database.

FIG. 1 illustrates an operating environment for a distributed proof of ownership platform, in accordance with some embodiments of the invention. As illustrated, the operating environment 100 may comprise a user 102 and/or a user device 104 in operative communication with one or more third party systems 400 (e.g., web site hosts, registry systems, third party entity systems, or the like). The operative communication may occur via a network 101 as depicted, or the user 102 may be physically present at a location separate from the various systems described, utilizing the systems remotely. The operating environment also includes a managing entity system 500, a distributed proof of ownership platform 200, a distributed register database 300, and/or other systems/devices not illustrated herein and connected via a network 101. As such, the user 102 may request information from or utilize the services of the distributed proof of ownership platform 200, or the third party system 400 by establishing operative communication channels between the user device 104, the managing entity system 500, and the third party system 400 via a network 101.

Typically, the distributed proof of ownership platform 200 and the distributed register database 300 are in operative communication with the managing entity system 500, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system 400). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, entertainment devices, laptop computers, cameras, video recorders, audio/video player, radio, GPS devices, any combination of the aforementioned, or the like. The user device is described in greater detail with respect to FIG. 3.

The managing entity system 500 may comprise a communication module and memory not illustrated, and may be configured to establish operative communication channels with a third party system 400 and/or a user device 104 via a network 101. The managing entity may comprise a data repository 256 which houses a decision repository 257 (e.g., a database of AI-ML decisioning information and associated metadata, authorized uses, authorized parties, authorized formats for use, identified uses, unauthorized use history, records of remedial measures taken, or the like). The data repository 256 may also contain user data. This user data may be used by the managing entity to authorize or validate the identity of the user 102 for accessing the system (e.g., via a username, password, biometric security mechanism, two-factor authentication mechanism, or the like). In some embodiments, the managing entity system is in operative communication with the distributed proof of ownership platform 200 and distributed register database 300 via a private communication channel. The private communication channel may be via a network 101 or the distributed proof of ownership platform 200 and distributed register database 300 may be fully integrated within the managing entity system 500, such as a virtual private network (VPN), or over a secure socket layer (SSL).

The managing entity system 500 may communicate with the distributed proof of ownership platform 200 in order to transmit data associated with observed AI-ML decisioning by or via a plurality of third party systems 400. In some embodiments, the managing entity may utilize the features and functions of the distributed proof of ownership platform 200 to initialize remedial measures in response to identifying a problem or with one or more AI-ML implementations. In other embodiments, the managing entity and/or the one or more third party systems may utilize the distributed proof of ownership platform 200 via a portal or application in order to query the distributed register database 300 for verification purposes. In some embodiments, this may be a public facing portal which allows a user to upload AI-ML data for containerization. The portal will then process the data, produce a blockchain signature, and then forward the signature to the distributed proof of ownership platform 200 for processing.

The distributed proof of ownership platform 200 may also be utilized to compare an embedded blockchain signature of previously containerized AI-ML data with the data from the distributed register database 300 and validate a match. In doing do, the distributed proof of ownership platform 200 may process and validate non-fungible tokens (NFTs) on the distributed register database which correspond to unique tokenized data on the distributed register, and which may be verified as to their authenticity, custody, ownership, usage history, implementation history, or the like. This response is then presented back to the requesting user thereby giving them an authoritative response as to whether an AI-ML model is being properly utilized, is functioning as intended, has been properly authorized for use, signed, distributed, or the like.

The publicly facing portal of the distributed proof of ownership platform 200 may also provide a way to ascertain if AI-ML data is being used by third parties without explicit permission. The process to identify data that contains entity intellectual property in the past has been limited by existing technology to identify elements using text (e.g., searching for a particular text string, or the like). The present invention utilizes a more secure, accurate, and less time-intensive way to validate certificates for AI-ML model usage.

FIG. 2 is a block diagram illustrating the distributed proof of ownership platform, in accordance with some embodiments of the invention. As illustrated in FIG. 2, the distributed proof of ownership platform 200 may include a communication device 244, a processing device 242, and a memory device 250 having an NFT generation engine 253, an application portal 254 and a processing system datastore 255 stored therein. As shown, the processing device 242 is operatively connected to and is configured to control and cause the communication device 244, and the memory device 250 to perform one or more functions. In some embodiments, the NFT generation engine 253 and/or the application portal 254 comprises computer readable instructions that when executed by the processing device 242 cause the processing device 242 to perform one or more functions and/or transmit control instructions to the distributed register database 300, the managing entity system 500, or the communication device 244. It will be understood that the NFT generation engine 253 or the application portal 254 may be executable to initiate, perform, complete, and/or facilitate one or more portions of any embodiments described and/or contemplated herein. The NFT generation engine 253 may comprise executable instructions associated with data processing and analysis related to AI-ML containerization or NFT lookup, and may be embodied within the application portal 254 in some instances. The distributed proof of ownership platform 200 may be owned by, operated by and/or affiliated with the same managing entity that owns or operates the managing entity system 500. In some embodiments, the distributed proof of ownership platform 200 is fully integrated within the managing entity system 500.

The NFT generation engine 253 may further comprise a metadata mapping engine 280, a feature extraction engine 281, and one or more machine learning dataset(s). The metadata mapping engine 280 may store instructions and/or data that may cause or enable the distributed proof of ownership platform 200 to extract, reformat, and/or analyze data received by the managing entity system 500 or the distributed register database 300. The data analysis module may process data to identify AI-ML resource categories which it can then use to locate the appropriate tokenized data on the distributed register database 300. The feature extraction engine 281 and machine learning dataset(s) may store instructions and/or data that cause or enable the distributed proof of ownership platform 200 to determine, in real-time and based on received information, features of certain AI-ML models that are being analyzed by the platform. Real time data and metadata aggregation and containerization is based on contextual understanding based on deep learning methods. Together, the metadata mapping engine 280 and feature extraction engine 281 provide a unique mapping engine for the NFT generation engine 253 that keeps track of all decision linked to various AI-ML models hosted in platform, and may be used as a feedback system for system.

In some embodiments, the metadata mapping engine 280 and feature extraction engine 281 may store instructions and/or data that cause or enable the distributed proof of ownership platform 200 to determine, in real-time and based on received information, a categorization for containerization of AI-ML data. The machine learning dataset(s) may contain data extracted or scraped from various AI-ML repositories or user data repositories via network 101, such as decisioning data received via an application portal 254. The distributed register database 300 may also contain metadata related to instances of AI-ML decisioning (e.g., location, time, user characteristics, security requirements, authorization determinations, resource accounts, transactions, ownership information, wallet address, permitted uses, device data, device history, or the like). In some embodiments, the machine learning dataset(s) may also contain data relating to user activity or device information, which may be stored in a user account managed by the managing entity system. In some embodiments, the NFT generation engine 253 may act as a data interjector for submitting proposed data records to the distributed register database 300. In some embodiments, AI-ML decisioning data initially submitted by the NFT generation engine 253 may be tokenized and stored on the distributed register as a unique token, referred to as a non-fungible token ("NFT").

The NFT generation engine 253 may receive data from a plurality of sources and, using one or more machine learning algorithms, may generate one or more machine learning datasets. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention.

The machine learning datasets may include machine learning data linking one or more details of user interactions to one or more factors indicating whether or not the user is authorized to conduct the interaction with one or more entity systems. For instance, the machine learning datasets may include data linking a particular user resource account to a given user identity, device identification, one or more time periods relating to typical user history, other situational data, or the like in which inform user validation decisioning. This data may enable the distributed proof of ownership platform 200 to identify with a percentage likelihood that a specific instance or interaction with entity systems or user accounts is or is not authorized by the managing entity. The data associated with an interaction or instance of use may be supplemented by additional data obtained from the managing entity system 500 or third party systems 400. For example, in some embodiments, the system may determine, based on location data obtained from a third party system 400 server, that the location (e.g., geographic location, URL location, server address, or the like), of a device indicates that the user initiating an interaction is likely not the true account owner. In other embodiments, the system may rely on data from a third party system 400 such as a registry or domain name server which may authenticate a certificate of use of a particular application, web portal, or the like. The distributed proof of ownership platform 200 may weight that information accordingly to determine that the likelihood that a particular instance or interaction may be authorized or unauthorized.

The application portal 254 may further comprise an AI-ML smart contract engine 270, a mobile application 271, or an API interface 272. In some embodiments, the user 102 may an AI-ML data request 273 via the user device 104 via the one or more components of the application portal 254. In this way, the distributed proof of ownership platform 200 may receive submissions from one or more users 102, and may further use the capabilities of the NFT generation engine 253 in order to communicate with the distributed register database 300 for identification, comparison, and analysis of authenticity, ownership, custody, permitted uses, or validity of decisioning by one or more AI-ML models. It is understood that the application portal may interact with the user device 104 via the AI-ML smart contract engine 270, mobile application 271, or an API interface 272, and in some embodiments a portion, complementary component, or all of each of these application portal aspects may exist locally on the user device as an entity application 1048 or user application 351, as discussed in FIG. 3, or may be provided through a web portal interface.

The communication device 244 may generally include a modem, server, transceiver, and/or other devices for communicating with other devices on the network 101. The communication device 244 may be a communication interface having one or more communication devices configured to communicate with one or more other devices on the network 101, such as the distributed proof of ownership platform 200, the user device 104, other processing systems, data systems, etc.

Additionally, the processing device 242 may generally refer to a device or combination of devices having circuitry used for implementing the communication and/or logic functions of the distributed proof of ownership platform 200. For example, the processing device 242 may include a control unit, a digital signal processor device, a microprocessor device, and various analog-to-digital converters, digital-to-analog converters, and other support circuits and/or combinations of the foregoing. Control and signal processing functions of the distributed proof of ownership platform 200 may be allocated between these processing devices according to their respective capabilities. The processing device 242 may further include functionality to operate one or more software programs based on computer-executable program code 252 thereof, which may be stored in a memory device 250, such as the application portal 254 and the agent 253. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the distributed proof of ownership platform 200 may generally refer to a device or combination of devices that store one or more forms of computer-readable media for storing data and/or computer-executable program code/instructions. For example, the memory device 250 may include any computer memory that provides an actual or virtual space to store data temporarily or permanently and/or commands provided to the processing device 242 when it carries out its functions described herein.

FIG. 3 is a block diagram illustrating a user device associated with the distributed proof of ownership platform, in accordance with some embodiments of the invention. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, entertainment devices, laptop computers, cameras, video recorders, audio/video player, radio, GPS devices, any combination of the aforementioned devices.

The user device 104 may generally include a processing device or processing device 1042 communicably coupled to devices such as, a memory device 1046, user output devices 1045 (for example, a user display or a speaker), user input devices 1044 (such as a microphone, keypad, touchpad, touch screen, and the like), a communication device or network interface device 360, a positioning system device 1043, such as a geo-positioning system device like a GPS device, an accelerometer, and the like, one or more chips, and the like.

The processing device 1042 may include functionality to operate one or more software programs or applications, which may be stored in the memory device 320. For example, the processing device 1042 may be capable of operating applications such as a user application 351, an entity application 1048, or a web browser application. The user application 351 or the entity application may then allow the user device 104 to transmit and receive data and instructions to or from the third party system 400, distributed proof of ownership platform 200, and the managing entity system 500, and display received information via a graphical user interface of the user device 104. The user application 1047 may further allow the user device 104 to transmit and receive data to or from the managing entity system 500 (for example, via wireless communication or NFC channels), data and instructions to or from the distributed proof of ownership platform 200, web content, such as, for example, location-based content and/or other web page content, according to a Wireless Application Protocol (WAP), Hypertext Transfer Protocol (HTTP), and/or the like. The user application 1047 may allow the managing entity 500 to present the user 102 with a plurality of recommendations, identified trends, suggestions, brand element data, pattern data, graph data, statistics, and/or the like for the user.

The processing device 1042 may be configured to use the communication device 1041 to communicate with one or more devices on a network 101 such as, but not limited to the third party system 400, the distributed proof of ownership platform 200, and the managing entity system 500. In this regard the processing device 1042 may be configured to provide signals to and receive signals from the communication device 1041. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 1041 may also include a user activity interface presented in user output devices 1045 in order to allow a user 102 to execute some or all of the processes described herein. The application interface may have the ability to connect to and communicate with an external data storage on a separate system within the network 101. The user output devices 1045 may include a display (e.g., a liquid crystal display (LCD) or the like) and a speaker 334 or other audio device, which are operatively coupled to the processing device 1042. The user input devices 1044, which may allow the user device 104 to receive data from the user 102, may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may also include a memory buffer, cache memory or temporary memory device 1046 operatively coupled to the processing device 1042. Typically, one or more applications 351 and 352, are loaded into the temporarily memory during use. As used herein, memory may include any computer readable medium configured to store data, code, or other information. The memory device 1046 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the distributed proof of ownership platform 200 performing one or more steps described herein in conjunction with other devices and systems, either automatically based on executing computer readable instructions of the memory device 250, or in response to receiving control instructions from the managing entity system 500. In some instances, the system refers to the devices and systems on the operating environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 4 is a block diagram illustrating an operating environment for the distributed trust computing network, in accordance with some embodiments of the invention. In particular, the operating environment may include a plurality of distributed register nodes 402, 403, 404, and 405 in operative communication with one another within the distributed trust computing network 401. The distributed trust computing network 401, as well as other networks as described herein, may operate communicatively between nodes using a global area network (GAN), such as the Internet, a wide area network (WAN), a local area network (LAN), or any other type of network or combination of networks. The network may provide for wireline, wireless, or a combination wireline and wireless communication between devices on the network.

The first distributed register node 402, the second distributed register node 403, the third distributed register node 404, and the fourth distributed register node 405 may be computing systems which host the brand element register repository (also referred to herein more generally as the "distributed register"). In some embodiments, the distributed register may comprise the data for all brand elements within the entity system. Accordingly, the distributed register nodes 402, 403, 404, and 405 are typically networked terminals or servers, but may also be desktop computers, laptops, smartphones or smart devices, IoT devices, or the like, or any combination thereof. Typically, each distributed register node 402, 403, 404, and 405 hosts a complete copy of the distributed register. The contents of the various copies of the distributed register hosted on the distributed register nodes 402, 403, 404, and 405 may be updated to be consistent with one another via a consensus algorithm executed by the distributed register nodes 402, 403, 404, and 405. In this way, a complete and verified copy of the distributed register may remain accessible even if the copy of the distributed register stored on one or more distributed register nodes 402, 403, 404, and 405 become inaccessible (e.g., due to being offline, experiencing high network latency, or the like) or corrupted (e.g., due to hardware/software errors, unauthorized modification of distributed register contents, or the like). It is understood that while four nodes are depicted in the embodiment shown in FIG. 3, there may be any number of nodes ("N" number of nodes) which make up the distributed trust computing network 401 and operate to validate entries and maintain a complete copy of the distributed register.

The operating environment may further comprise the distributed register database 300 which may be in operative communication with the distributed register nodes 402, 403, 404, and 405 of the distributed trust computing network 401. The distributed register database 300 may be a computing system that submits data to the nodes 402, 403, 404, and 405 in the form of proposed data records to be added to the distributed register. The distributed register database 300 may further be used to manage interjectors and receive notifications regarding the data within the distributed register. Accordingly, the distributed register database 300 may be one or more desktop computers, laptop computers, smartphones, tablets, smart devices, IoT devices, single board computers, or the like. In some embodiments, distributed register database 300 may be operated by a user within the entity. In other embodiments, the distributed register database 300 may automatically perform various functions to manage submitted or retrieved data or interjectors.

The submission and receipt of data between distributed register database 300 and the distributed trust computing network 401 may be achieved through one or more nodes described in FIG. 1 (e.g., the node 1, the node 2, or the like) and immediately processed for submission to the distributed register, such that that data hops or manual data touchpoints are reduced to preferably zero, allowing the system to maintain maximum integrity of data validation. The automated flow of permissioned ledger data allows the leveraging of distributed register technology and distributed register based services directly to entity side systems. The distributed register database 300 may be designed to provide access to data stored on the distributed register to third party systems as well. For instance, the third party system may comprise an overseeing entity conducting an investigation or study of data history or patterns within the data stored on the distributed register.

It should be understood by those having ordinary skill in the art that although the distributed register nodes 402, 403, 404, and 405, and/or the distributed register database 300 are depicted as single units, each of the depicted components, or sub-components therein, may represent multiple units. In some embodiments, a given computing system as depicted in FIG. 3 may represent multiple systems configured to operate in a distributed fashion. In other embodiments, the functions of multiple computing systems may be accomplished by a single system. For instance, the functions of the data monitoring system 106 may be accomplished by one or more of the distributed register nodes 402, 403, 404, and 405. It should further be understood that even though reference may be made to a single "distributed trust computing network 401," all singular usages of "distributed trust computing network" or "distributed register" may also refer to multiple distributed registers. For instance, separate distributed registers may be stored on the nodes 402, 403, 404, and 405 on a per-application or per-parameter basis.

FIG. 5 is a block diagram illustrating the data flow for NFT tagging of AI-ML decisioning, in accordance with some embodiments of the invention. As shown by the surrounding box 550, a number of components and features comprise an AI-ML platform 550 which is used for the generation of NFTs and the subsequent lookup or analysis of previously containerized AI-ML data. As shown in block 501, a deep learning engine 501 may be utilized to streamline the process for generation of AI-ML smart contracts via the AI-ML smart contract engine 270. The application portal 254 may comprise an AI-ML smart contract engine 270, a mobile application 271, or an API interface 272. In some embodiments, the user 102 may an AI-ML data request 273 via the user device 104 via the one or more components of the application portal 254. In this way, the distributed proof of ownership platform 200 may receive submissions from one or more users 102, and may further use the capabilities of the NFT generation engine 253 in order to communicate with the distributed register database 300 for identification, comparison, and analysis of authenticity, ownership, custody, permitted uses, or validity of decisioning by one or more AI-ML models. It is understood that the application portal may interact with the user device 104 via the AI-ML smart contract engine 270, mobile application 271, or an API interface 272.

As further shown in block 281, feature extraction engine may then be employed to extract and categorize data related to AI-ML decisioning (e.g., infrastructure resources such as IP address, device information, server information, host environment details, geolocation data, or the like, or algorithm features such as model version, data semantics, algorithm types, binary files, data capture files and formats, data logs, or the like). The NFT generation, located in block 253, may be used to containerize such extracted data, and may feed data on containerization to the metadata mapping engine 505, which may store information related to generated NFT files for later cross-reference and lookup by the distributed proof of ownership platform 200. Data produced by this process may be stored in decision repository 257, which can be queried by NFT acquisition engine 503, and one or more monitoring system(s) 502.

FIG. 6 is a block diagram illustrating NFT containerization, in accordance with some embodiments of the invention. As illustrated graphically in FIG. 6, data related to AI-ML decisioning may be stored in a container of one or more NFTs generated by the distributed proof of ownership platform 200. As shown by blocks 601, 602, and 603, these NFTs may be visualized as NFT 1, NFT 2, NFT N, and so on, respectively, which are each stored in their own respective containers. Each NFT may house different data related to the same AI-ML decision. For instance, NFT 1 might contain infrastructure resources 610, such as IP address, device information, server information, host environment details, geolocation data, or the like. NFT 2 may contain algorithm features 620, such as model version, data semantics, algorithm types, binary files, data capture files and formats, data logs, or the like. The total sum of NFTs generated for a given AI-ML decision instance may be containerized in a container package 630, which can be further tokenized and stored as its own NFT on the distributed proof of ownership platform 200.

FIG. 7 is a process flow illustrating user initiation of NFT containerization, in accordance with some embodiments of the invention. As shown in block 702, a user may initiate an AI-ML application. The distributed proof of ownership platform 200 may collect data as the AI-ML application is active, including any metadata, infrastructure resource data 610, algorithm data 620, or the like, as indicated in block 704. The distributed proof of ownership platform 200 may then containerize this data, using one or more containers and container packages 630, as indicated in block 706. The containerized information may then be indexed by the distributed proof of ownership platform 200 utilizing the metadata mapping engine 505, as shown in block 708. As each NFT token is generated by the distributed proof of ownership platform 200, it is linked to its respective container and container package(s) 630, as shown in block 710. Finally, the distributed proof of ownership platform 200 may release the container and container package(s) 630 in an AI-ML decision repository 257, as indicated in block 712, which can later be accessed by one or more users via the application portal 254 to validate or study one or more AI-ML decision instances.

As an example, in some embodiments, a user 102 may initiate a facial recognitions application, wherein the distributed proof of ownership platform 200 may capture resource details from the user device 104. The distributed proof of ownership platform 200 may then capture data and metadata at time (t) when an image is captured for biometric authentication purposes. In conjunction, the distributed proof of ownership platform 200 may also capture AI-ML processing data and metadata details related to the AI-ML operation of determining user authentication. For instance, data and metadata related to AI-ML operations may include geolocation, device properties, IP address, user details, user account details, temporal details, extracted features, file type data, semantic algorithms, type algorithm version, AI-ML host infrastructure details, IP address of servers, decision processing time, data processing binary, decision outputs, or data associated with decision like alerts, messages, error logs, or the like. The distributed proof of ownership platform 200 may capture the final output decision of the AI-ML model, and use such data to generate an NFT containerizing information for future validation. As such, the system can be used as a control for IoT applications that auto-execute payment based on sensor data or contextual data feeds using AI-ML algorithms. The platform may also be used to trace features or conditions that are altered by unauthorized actors to execute payments, or manipulate security systems. In such scenarios, proof of ownership of decisions performed by AI-ML driven application can be established to validate or invalidate certain instances or actions initiated by one or more user(s) 102.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for secure storage of artificial intelligence and machine learning data, the system comprising:
- at least one non-transitory storage device; and
- at least one processing device coupled to the at least one non-transitory storage device, wherein the at least one processing device is configured to:
  - initiate an application portal on a user device;
  - transmit instructions to the application to collect data and metadata related to an artificial intelligence or machine learning (AI/ML) output generated by an AI/ML program;
  - provide a metadata mapping engine, wherein the metadata mapping engine extracts and categorizes the data and the metadata into a plurality of categories;
  - generate, for each categorization corresponding to the AI/ML output, a non-fungible token (NFT) comprising the data or the metadata, wherein each NFT corresponds to a specific category;
  - assign each NFT to a respective container;
  - assign each of the respective containers to a container package, wherein the container package comprises each respective container related to the AI/ML output;
  - generate an index file for the container package;
  - generate a non-fungible token (NFT) for the container package, wherein the NFT is linked to the container package;
  - store the index file and store address information for the container package in a decision repository;
  - validate the data and the metadata stored in the container package by comparing the stored data and the stored metadata for the AI/ML output with original data associated with the AI/ML program upon each access request;
  - implement a smart contract engine within the application for data validation and permission management for accessing stored AI/ML data; and
  - enable audit logging and tracking of data access and modification events, storing the data access and modification events in the decision repository along with the index file and NFT details.

2. The system of claim 1, wherein the application portal further comprises a smart contract engine.

3. The system of claim 1, wherein collecting the data and the metadata related to the AI/ML output further comprises using a deep learning engine to extract data from one or more servers.

4. The system of claim 1, wherein the data and the metadata related to the AI/ML output further comprise infrastructure resource data including one or more of an IP address, device information, server information, host environment details, or geolocation data.

5. The system of claim 1, wherein the data and the metadata related to the AI/ML output further comprise algorithm features including one or more of a model version, data semantics, algorithm type, data capture files, data formats, or data logs.

6. A computer program product for secure storage of artificial intelligence and machine learning data, the computer program product comprising at least one non-transitory computer-readable medium having computer-readable program code portions embodied therein, the computer-readable program code portions comprising:
- an executable portion configured to initiate an application portal on a user device;
- an executable portion configured to transmit instructions to the application to collect data and metadata related to an artificial intelligence or machine learning (AI/ML) output generated by an AI/ML program;
- an executable portion configured to provide a metadata mapping engine, wherein the metadata mapping engine extracts and categorizes the data and the metadata into a plurality of categories;
- an executable portion configured to generate, for each categorization corresponding to the AI/ML output, a non-fungible token (NFT) comprising the data or the metadata, wherein each NFT corresponds to a specific category;

an executable portion configured to assign each NFT to a respective container;

an executable portion configured to assign each of the respective containers to container package, wherein the container package comprises each respective container related to the AI/ML output;

an executable portion configured to generate an index file for the container package;

an executable portion configured to generate a non-fungible token (NFT) for the container package, wherein the NFT is linked to the container package;

an executable portion configured to store the index file and store address information for the container package in a decision repository;

an executable portion configured to validate of the data and the metadata stored in the container package by comparing the stored data and the stored metadata for the AI/ML output with original data associated with the AI/ML program upon each access request;

an executable portion configured to implement a smart contract engine within the application for data validation and permission management for accessing stored AI/ML data; and an executable portion configured to enable audit logging and tracking of data access and modification events, storing the data access and modification events in the decision repository along with the index file and NFT details.

7. The computer program product of claim 6, wherein the application portal further comprises a smart contract engine.

8. The computer program product of claim 6, wherein collecting the data and the metadata related to the AI/ML output further comprises using a deep learning engine to extract data from one or more servers.

9. The computer program product of claim 6, wherein the data and the metadata related to the AI/ML output further comprise infrastructure resource data including one or more of an IP address, device information, server information, host environment details, or geolocation data.

10. The computer program product of claim 6, wherein the data and the metadata related to the AI/ML output further comprise algorithm features including one or more of a model version, data semantics, algorithm type, data capture files, data formats, or data logs.

11. A computer-implemented method for secure storage of artificial intelligence and machine learning data, the method comprising:

providing a computing system comprising a computer processing device and a non-transitory computer readable medium, wherein the computer readable medium comprises configured computer program instruction code, such that when said instruction code is operated by said computer processing device, said computer processing device performs the following operations:

initiate an application portal on a user device;

transmit instructions to the application to collect data and metadata related to an artificial intelligence or machine learning (AI/ML) output generated by an AI/ML program;

provide a metadata mapping engine, wherein the metadata mapping engine extracts and categorizes the data and the metadata into a plurality of categories;

generate, for each categorization corresponding to the AI/ML output, a non-fungible token (NFT) comprising the data or the metadata, wherein each NFT corresponds to a specific category;

assign each NFT to a respective container;

assign each of the respective containers to a container package, wherein the container package comprises each respective container related to the AI/ML output;

generate an index file for the container package;

generate a non-fungible token (NFT) for the container package, wherein the NFT is linked to the container package;

store the index file and store address information for the container package in a decision repository;

validate the data and the metadata stored in the container package by comparing the stored data and the stored metadata for the AI/ML output with original data associated with the AI/ML program upon each access request;

implement a smart contract engine within the application for data validation and permission management for accessing stored AI/ML data; and enable audit logging and tracking of data access and modification events, storing the data access and modification events in the decision repository along with the index file and NFT details.

12. The computer-implemented method of claim 11, wherein the application portal further comprises a smart contract engine.

13. The computer-implemented method of claim 11, wherein collecting the data and the metadata related to the AI/ML output further comprises using a deep learning engine to extract data from one or more servers.

14. The computer-implemented method of claim 11, wherein the data and the metadata related to the AI/ML output further comprise infrastructure resource data including one or more of an IP address, device information, server information, host environment details, or geolocation data.

15. The computer-implemented method of claim 11, wherein the data and the metadata related to the AI/ML output further comprise algorithm features including one or more of a model version, data semantics, algorithm type, data capture files, data formats, or data logs.

16. The system of claim 1, further comprising a feature extraction engine configured to determine, in real-time and based on the collected data and the collected metadata, features of the AI/ML output.

17. The system of claim 16, wherein the metadata mapping engine and the feature extraction engine are configured to jointly track all actions or decisions associated with the AI/ML program, and provide, in real-time, feedback to the application.

18. The computer program product of claim 6, further comprising a feature extraction engine configured to determine, in real-time and based on the collected data and the collected metadata, features of the AI/ML output.

19. The computer program product of claim 18, wherein the metadata mapping engine and the feature extraction engine are configured to jointly track all actions or decisions associated with the AI/ML program, and provide, in real-time, feedback to the application.

20. The computer-implemented method of claim 11, further comprising a feature extraction engine configured to determine, in real-time and based on the collected data and the collected metadata, features of the AI/ML output, wherein the metadata mapping engine and the feature extraction engine are configured to jointly track all actions or decisions associated with AI/ML program, and provide, in real-time, feedback to the application.

* * * * *